United States Patent [19]

Eidsmore

[11] Patent Number: 5,238,016
[45] Date of Patent: Aug. 24, 1993

[54] METHOD OF SUPPLY PRESSURE EFFECT SENSING AND ASSOCIATED GAGE

[76] Inventor: Paul G. Eidsmore, 2 Blue Hill Ct., Scotts Valley, Calif. 95066

[21] Appl. No.: 932,336

[22] Filed: Aug. 19, 1992

Related U.S. Application Data

[63] Continuation of Ser. No. 780,094, Oct. 17, 1991, abandoned, which is a continuation of Ser. No. 440,892, Nov. 22, 1989, abandoned, which is a continuation of Ser. No. 213,630, Jun. 30, 1988, abandoned, which is a continuation of Ser. No. 826,021, Feb. 4, 1986, abandoned, which is a continuation-in-part of Ser. No. 826,022, Feb. 4, 1986, Pat. No. 4,694,860, which is a continuation-in-part of Ser. No. 675,825, Nov. 28, 1984, Pat. No. 4,624,443, which is a continuation-in-part of Ser. No. 398,845, Jul. 16, 1982, abandoned.

[51] Int. Cl.$^5$ .................................................. G01L 7/00
[52] U.S. Cl. ........................................... 137/1; 73/700; 137/12; 137/505; 137/557
[58] Field of Search .............. 137/1, 12, 505, 505.12, 137/557; 73/700, 708, 717, 723, 730

[56] References Cited

U.S. PATENT DOCUMENTS

| | | | |
|---|---|---|---|
| 67,096 | 7/1867 | Ashcroft | 73/700 |
| 1,413,514 | 4/1922 | Berry. | |
| 1,658,951 | 2/1928 | Stitt | 251/61.5 X |
| 2,047,101 | 7/1936 | Grove | 137/505.37 |
| 2,272,243 | 2/1942 | Jacobsson et al. | 137/505.42 X |
| 2,645,884 | 7/1953 | Kellie | 137/505.47 |
| 2,650,455 | 9/1953 | Jacobsson et al. | 137/505.42 |
| 2,667,895 | 2/1954 | Pool et al. | 251/65 X |
| 2,702,561 | 2/1955 | Geffroy. | |
| 2,747,607 | 5/1956 | Matasovic | 137/505.42 |
| 2,981,281 | 4/1961 | Peras. | |
| 3,259,144 | 7/1966 | Taplin. | |
| 3,276,470 | 10/1966 | Griffing. | |
| 3,286,726 | 11/1966 | Guy. | |
| 3,319,649 | 5/1967 | Cummins | 137/505.18 |
| 3,443,583 | 5/1969 | Webb | 137/505.12 |
| 4,287,909 | 9/1981 | Tompson et al. | 137/505.14 X |
| 4,450,721 | 5/1984 | Gaunt et al. | 73/708 |
| 4,468,968 | 9/1984 | Kee | 73/708 |
| 4,680,972 | 7/1987 | Wareham | 73/730 |

FOREIGN PATENT DOCUMENTS 558542  1/1944  United Kingdom ........... 137/505.42

*Primary Examiner*—Stephen M. Hepperle
*Attorney, Agent, or Firm*—Fay, Sharpe, Beall, Fagan, Minnich & McKee

[57] ABSTRACT

An improved fluid system and method of monitoring fluid volume in a supply cylinder is provided. A pressure regulator is disposed immediately downstream from a shutoff valve associated with the supply cylinder. A meter or gage is then positioned downstream of the regulator to monitor outlet or downstream pressure. The fluid volume in the supply cylinder upstream of the regulator is then determined by means of a modified gage. A data processor and pressure transducer may also be associated with the system to monitor other parameters or provide further information related to system performance.

7 Claims, 3 Drawing Sheets

METHOD OF SUPPLY PRESSURE EFFECT SENSING AND ASSOCIATED GAGE

CROSS-REFERENCE TO RELATED APPLICATIONS

This application is a continuation application of co-pending application Ser. No. 780,094, filed Oct. 17, 1991, now abandoned, which is a continuation of Ser. No. 440,892, filed Nov. 22, 1989, now abandoned, which is a continuation-in-part of Ser. No. 213,630, filed Jun. 30, 1988, now abandoned, which is a continuation of Ser. No. 826,021, filed Feb. 4, 1986, now abandoned, which is a continuation-in-part of Ser. No. 826,022 filed Feb. 4, 1986, now U.S. Pat. No. 4,694,860, which is a continuation-in-part of Ser. No. 675,825, filed Nov. 28, 1984, now U.S. Pat. No. 4,624,443, which is a continuation-in-part of Ser. No. 398,845, filed Jul. 16, 1982, now abandoned.

BACKGROUND OF THE INVENTION

A system which operates with fluids under pressure commonly requires a pressure regulator to assure that fluid from a source under high pressure is supplied to the system at low, substantially steady pressure. The pressure regulator must maintain a steady pressure even though variations in the fluid pressure at the source may occur. In a system which is supplied, for example, from a cylinder of compressed gas at extremely high pressure, it is common practice to install a pressure regulator downstream of a shutoff valve on the cylinder. This arrangement minimizes the number of system components that operate at potentially hazardous high pressures. Thus, a supply of compressed gas at substantially steady, low pressure is provided to the system, despite the drop in pressure of the gas in the cylinder as the gas is released or used over time. Since the volume of a gas or fluid within a cylinder is directly related to the pressure at a given temperature, a high-pressure gage or meter is typically provided between the shutoff valve on the cylinder and the pressure regulator. Through suitable conversion analysis, an indication of supply pressure can be used to determine the volume of gas remaining in the cylinder. Thus, a typical system, utilizing a cylinder to supply pressurized gas thereto, includes a shutoff valve disposed at the cylinder outlet. Downstream of the shutoff valve is a pressure gage to provide an indication of the pressure, and likewise the volume, of gas remaining in the cylinder. The next system component is the pressure regulator that reduces the pressure of gas supplied downstream. Although the pressure regulator limits the number of components associated with the cylinder that are exposed to high pressure, this arrangement still requires the gage to be subjected to high pressure.

Heretofore, moving the gage from the preferred position in the system between the shutoff valve and pressure regulator proved highly disadvantageous since no effective substitute was provided to monitor the supply of gas remaining in the cylinder. If the gage was removed entirely from the system, no effective means remained to indicate supply fluid volume. Alternatively, positioning the gage downstream of the pressure regulator was generally considered impractical and useless since it did not convey to an operator the typical relationship of a decrease in pressure as the gas volume in the cylinder decreased.

Another problem associated with use of a meter or gage in handling certain toxic gases is gas entrapment at the dead end of a fluid line. For example, it is common practice to use Bourdon type gages that include an expansible member responsive to pressure changes. The predetermined expansion and contraction of the expansible member provides an accurate readout or indication of fluid pressure in a system. Since the construction and operation of Bourdon type gages is already well known in the art further discussion is deemed unnecessary.

When handling toxic and/or pyrophoric gases such as silane, it is necessary to purge the fluid system. For example, when initially inserted into a fluid system, air may be trapped in the expansible member of the gage. To limit the potential for adverse reaction with a pyrophoric gas, a vacuum connection is made and the air is removed from the gage. Then, the expansible member is pulse purged with nitrogen before the gage is deemed operational.

SUMMARY OF THE INVENTION

The present invention advantageously utilizes an inverse relationship between gas volume remaining in the cylinder and the regulated outlet pressure so that only low-pressure monitoring is required to obtain an accurate indication of the volume of gas remaining in a supply cylinder.

According to a more limited aspect of the invention, the method of monitoring supply fluid volume includes measuring the fluid pressure downstream of the pressure regulator and determining the fluid volume of the gas supply in response thereto.

According to another aspect of the invention, a gage is provided having a first set of indicia representing the fluid pressure in the supply cylinder and a second set of indicia representing the fluid pressure downstream of the pressure regulator.

According to yet another aspect of the invention, a pressure transducer provides data relating to various system parameters to a data processor which processes the data to provide an accurate indication of supply fluid volume.

A principal advantage of the invention is realized through the elimination of the need for high-pressure monitoring, with associated hazards of rupture and leak at a location upstream of the pressure regulator, through direct coupling of the regulator to the shutoff valve of the cylinder.

Another advantage is found in the elimination of the purge problem associated with the high pressure gage in conventional fluid systems.

Yet another advantage of the invention resides in the simplified gage that provides multiple information.

Still other advantages and benefits of the invention will become more apparent from a reading and understanding of the following detailed description.

BRIEF DESCRIPTION OF THE DRAWINGS

The invention may take physical form in certain parts and arrangements of parts, preferred and alternate embodiments and methods of which will be described in detail in this specification and illustrated in the accompanying drawings which form a part hereof and wherein.

DETAILED DESCRIPTION OF THE PREFERRED EMBODIMENTS AND METHOD

Figure 1:
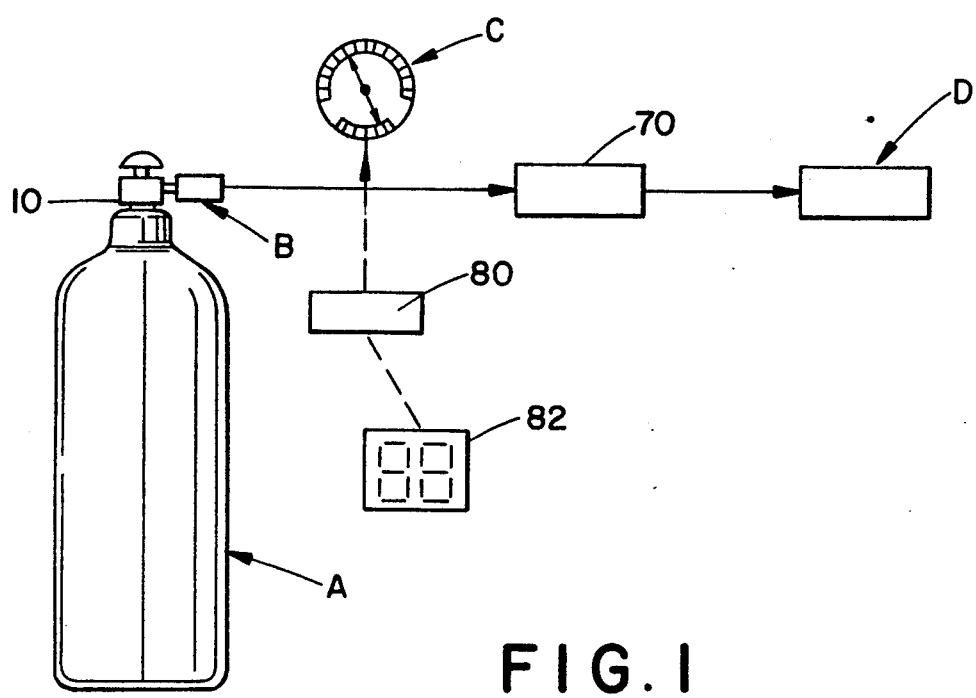
FIG. 1 is a pictorial diagram of a gas pressure system assembled according to the present invention.

According to the present invention and as generally illustrated in FIG. 1, a supply of fluid such as a gas is provided by a cylinder A. The supply cylinder A is connected to a pressure regulator B to reduce the pressure of the gas. A meter or gage C is disposed adjacent the regulator to monitor the gas supply as will become more apparent below. Then, the gas is utilized in a downstream system D.

More particularly, the cylinder supplies gas at a high pressure on the order of 2500-3000 psi. Of course one of ordinary skill in the art will realize that the pressure ranges are merely for purposes of discussion and to facilitate an understanding of the principles involved. Other pressure ranges can be used without departing from the scope and intent of the subject invention. As indicated above, the gage in prior arrangements was typically positioned immediately downstream of a shutoff valve. If the supply cylinder was full, the gage would register a pressure of 3000 psi and an operator would immediately understand that the cylinder was indeed full. As the gas was utilized, the pressure reading would decrease and, again, an operator would recognize that the supply cylinder was emptying.

This relationship is eliminated if the fluid volume is monitored by a gage C positioned downstream of the pressure regulator B. By definition a regulator is designed to control the pressure conveyed to the utilization system. The usual change in pressure, i.e., a decrease as the gas is used, is not encountered. Thus, it has been accepted practice to monitor fluid volume in the supply cylinder by means of a gage interposed between the supply cylinder and the regulator where the relationship of decreasing fluid pressure with decreasing supply volume is still found.

Figure 2:
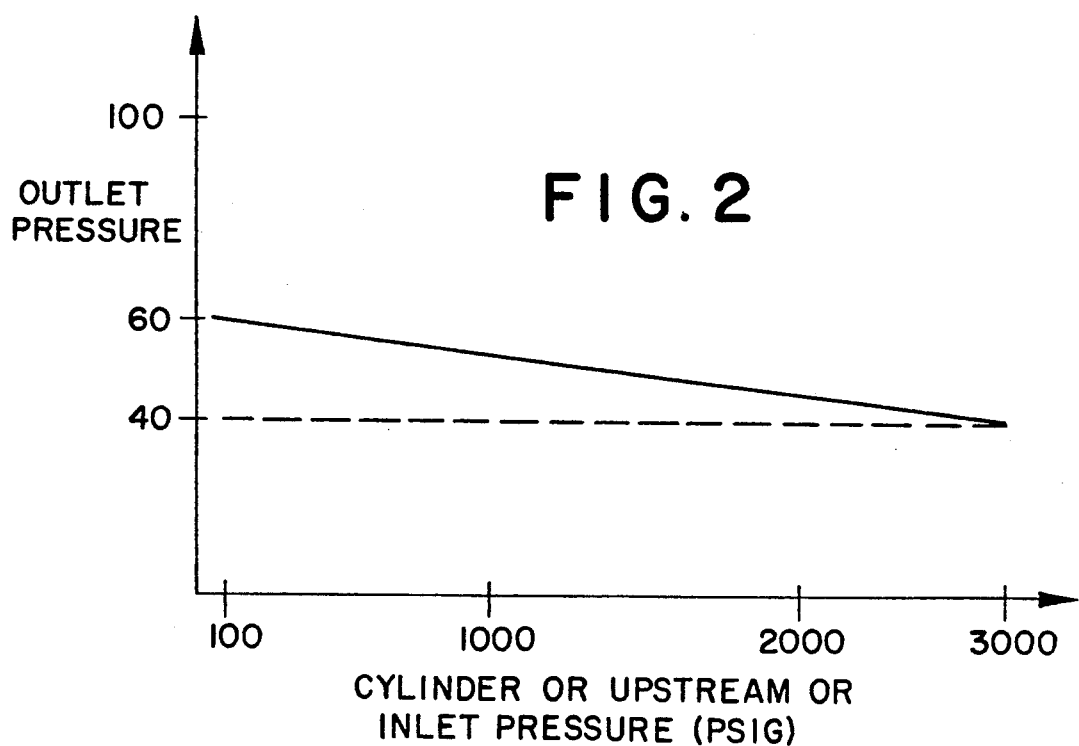
FIG. 2 is a graph showing the inverse relationship of regulated outlet pressure as a function of inlet pressure which facilitates low-pressure monitoring of remaining gas volume in a supply cylinder.

With particular reference to FIGS. 1 and 2, the arrangement of the subject invention, though, disposes the pressure regulator B immediately downstream of shutoff valve 10 associated with the supply cylinder. The details of the shutoff valve form no part of the invention so that further discussion thereof is deemed unnecessary. The shutoff valve essentially has two positions, namely on and off, to control the supply of high pressure gas to the system. The regulator, on the other hand, can adopt a wide variety of positions in response to changing pressure levels.

Figure 3:
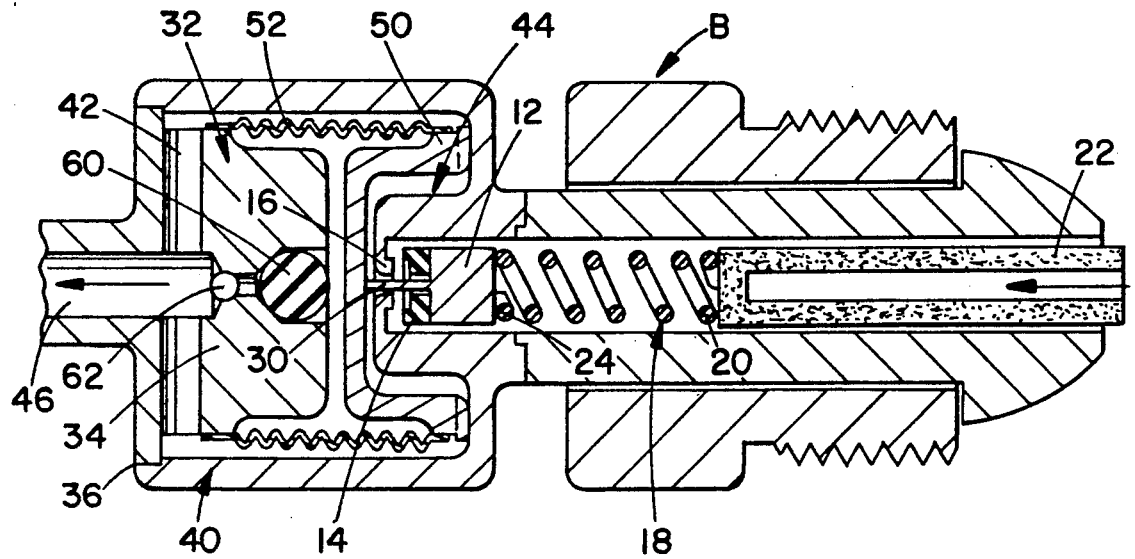
FIG. 3 is a cross-sectional view of an embodiment of the pressure regulator of the present invention which is generally cylindrically-shaped in a coaxial configuration and which is illustrated operating in an extreme condition of low outlet pressure.
Figure 4:
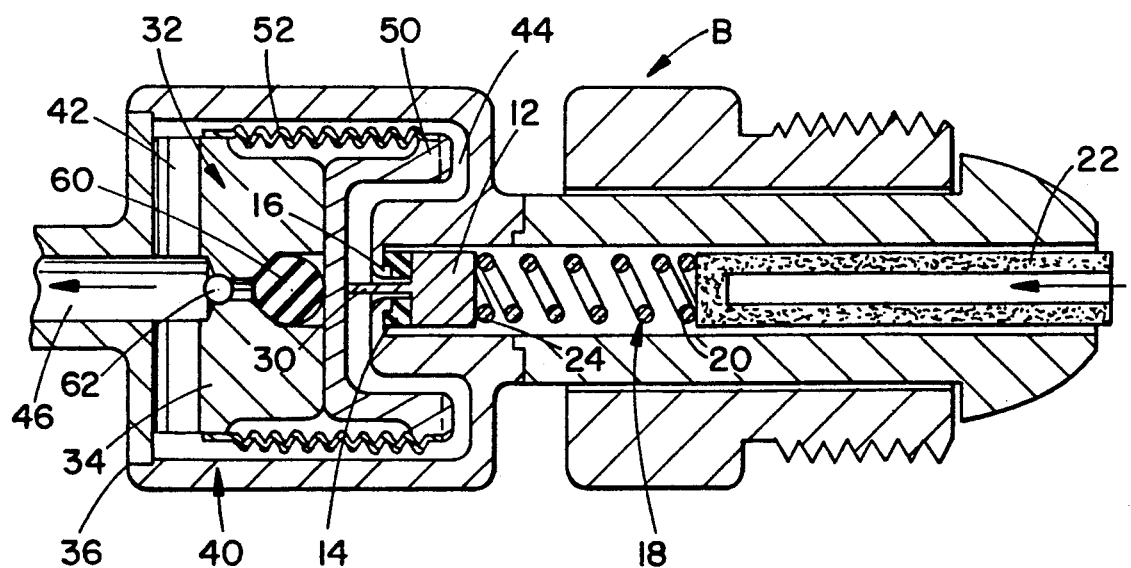
FIG. 4 is a cross-sectional view of the embodiment of FIG. 3 illustrated operating in an extreme condition of high outlet pressure.

As illustrated in FIGS. 3 and 4, details of one preferred regulator will be described in greater detail. A poppet member 12 includes an elastomeric sealing member 14 that selectively engages valve seat 16. A biasing means such as spring 18 urges the poppet member toward the valve seat. According to this arrangement, a first end 20 of the spring engages an in-line filter 22 while a second end 24 engages the poppet member. A stem 30 extends generally axially outward from the poppet member and through the valve seat for selective engagement with a pre-charged expandable member such as bellows assembly 32.

The bellows assembly includes a first or stationary portion 34 that is peripherally welded at 36 to the pressure regulator body 40. Generally radial passages 42 communicate between a valve chamber 44 and outlet fluid passage 46. A second or movable portion 50 is secured by means of a bellows 52 to the first portion. Preferably opposite ends of the bellows are welded to the first and second portions of the bellows assembly to define a closed, pre-charged expandable member that cooperates with the stem 30 to open and close the regulator in response to varying fluid pressure.

An elastomeric member 60 is received in the bellows assembly to serve as a temporary check valve until ball 62 is welded in place. Thus, the bellows assembly is secured together and then pressurized to a selected pressure above ambient. The elastomeric member maintains the pressure in the bellows assembly until the welding is completed. This internal pressurization causes the bellows to expand longitudinally against its own resilient restoring force and thereby position the movable second portion at a location that is representative of the net pressure differential acting on the bellows assembly.

In addition to positioning the regulator immediately downstream of the shutoff valve, the subject invention monitors or senses fluid pressure downstream of the regulator to provide an indication of supply fluid volume, a practice, as indicated above, previously thought to be unworkable. As best illustrated in FIG. 2, the outlet pressure, or pressure downstream of the regulator, increases slightly as the upstream or supply cylinder pressure decreases.

As the supply gas is used, the pressure decreases, to a level of, for example, 100 psi. This results in a much lower closing force being exerted on the poppet member. Conversely, the opening force required to overcome the reduced closing force is substantially smaller. Since the pressure charge in the bellows assembly does not change, a substantially smaller pressure differential between the outlet pressure and that pressure maintained in the bellows assembly is required to overcome the reduced closing force exerted on the poppet member by the supply gas. Thus, only a slight differential pressure is required to open the poppet member. For example, an outlet pressure just less than 60 psi may prove satisfactory when the supply pressure is approximately 100 psi.

On the other hand, when the cylinder is full the inlet pressure is high (about 3000 psi) and the closing force imposed on the poppet member is also high. The outlet pressure, though, is reduced to a level of approximately 40 psi. Again, this inverse relationship is best evidenced in FIG. 2 and will be displayed on the gage C as will become more apparent below.

The increase in downstream pressure (40 to 60 psi) seems confusing when compared to the decrease in supply gas volume. Nevertheless, this relationship is advantageously used according to the subject invention to allow monitoring of outlet pressure to provide an indication of supply gas pressure. As indicated above, once the supply or cylinder pressure is known, the fluid volume can be determined.

Figure 5:
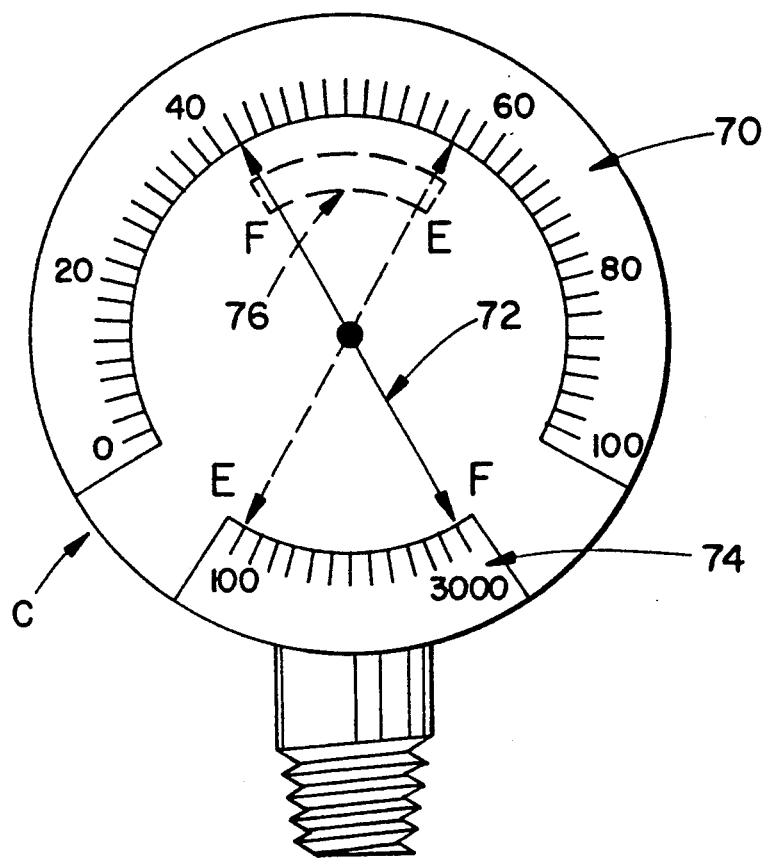
FIG. 5 is plan view of a gage or meter including first and second set of indicia for monitoring the volume of the fluid supply and the regulator outlet pressure.

More specifically, and with reference to FIG. 5, the meter or gage C is shown in greater detail. A first set of indicia 70 is representative of fluid pressure, particularly the fluid pressure sensed downstream of the regulator. An indicator needle 72 is pivotally mounted along a central portion to permit selective movement in response to pressure changes. The needle is preferably extended from the other side of the pivot point to cooperate with a second set of indicia 74 representative of the gas volume in the supply cylinder. Due to the arrangement of the first and second sets of indicia, the higher pressure reading (60 psi) corresponds to the lower supply or inlet pressure reading (E for empty) and, vice versa, the lower pressure reading (40 psi) corresponds to the higher supply or inlet pressure reading (F for full). Alternatively, the second set of indicia may be interposed between the pivot point and the first set of indicia as illustrated in phantom by numeral 76 in FIG. 5. With this alternative arrangement, the needle need not be extended on the opposite end. The second set of indicia, though, must maintain the same relationship with respect to the outlet pressure readings as described above. Alternatively, the second set of indicia may be altered or additionally illustrate upstream fluid pressure, for example, ranging from 3000 psi (that corresponds to F for full and 40 psi downstream fluid pressure) to 0 psi (that corresponds to E for empty and 60 psi downstream fluid pressure). Thus, the terminology of "supply pressure effect sensing" refers to the concept of low pressure monitoring on the downstream side of a pressure regulator to provide an indication of the supply fluid volume, thus eliminating the need for an gage upstream of the pressure regulator. Of course still other meters or gages can be used without departing from the scope and intent of the invention.

Still further modifications are contemplated with respect to the monitoring of outlet pressure from a regulator to provide an indication of supply volume upstream of the regulator. For example, the pressure reading may be digitalized by means of a pressure transducer and signals sent to a data processor 80 (FIG. 1) for conversion to a suitable readout or display 82 based on predetermined information associated with the processor. Still further, data can be collected, handled, or provided by the processor to provide more detailed information as to the operation of the system. Flow rate, consumption, available supply, etc. are merely representative of other information that can be handled and/or displayed by the processor and displayed in conjunction with, or as an alternative to, readout C.

In the pressure regulator illustrated in FIGS. 3 and 4, the opening defined at the valve seat 16 is also important in advantageously using the concept of supply pressure effect sensing. More specifically, suitable adjustment of the size of the opening in the pressure regulator will determine the amount of force on the poppet member. That is, since force is dependent on the cross-sectional area over which the pressure acts, the force required to open the pressure regulator can be appropriately shifted through careful selection of the size of the opening.

It is generally considered desirable to decrease the size of the orifice as much as possible so as to limit the force imposed on the poppet member. As briefly described above, the force required to open the poppet member is directly related to both the size of the orifice and the fluid pressure. Therefore, pressure regulators designed to handle high pressures of approximately 3000 psi minimize the size of the orifice.

Additionally, pressure regulator designers want to have the smooth or consistent downstream pressures no matter what amount of fluid remains in the supply cylinder. For example, the 20 pound shift in outlet pressure associated with the subject invention (i.e. from 40 psi with a full cylinder to 60 psi with an empty cylinder) is not desired because of the pressure fluctuation exerted on downstream components. This is another reason that the orifice is maintained as small as possible since a small orifice will reduce the shift in outlet pressure.

Minimizing the size of the orifice, though, has drawbacks. Two primary drawbacks are that (i) there is less fluid flow even in a full open position of the pressure regulator and (ii) a greater temperature drop is associated with a small orifice as the gas expands into a larger volume after passing therethrough.

Still further, fluid systems usually employ a tandem pressure regulator arrangement where two pressure regulators are actually combined into the same body. The first regulator provides the first reduction in pressure and the second regulator smooths out the fluid pressure even more. Thus, with a tandem regulator the fluid pressure is reduced and a smooth pressure is provided to the downstream components irrespective of fluid volume remaining in the supply cylinder.

The subject invention, though, permits the orifice to be substantially enlarged, and in fact, to a degree, is desired. For example, the orifice can be made approximately five times larger than conventional pressure regulator orifices. In a preferred arrangement of pressure regulator adapted for high pressure systems, the orifice constructed in accordance with the principles of the invention is about 0.120 inches in diameter while the typical pressure regulator opening is on the order of 0.06 inches in diameter.

Further, the wider the shift in outlet pressure, the greater accuracy or finer calibration that results with supply pressure effect sensing. Controlling or calibrating the size of the orifice will determine the extent of outlet pressure shift. Thus, and with reference to FIG. 1, the gage C is disposed downstream of the pressure regulator B as described above. Then, a second pressure regulator 90 may be utilized and disposed closely adjacent the downstream system D. The second pressure regulator can smooth out the fluid pressure with the same resultant degree of accuracy as the typically used tandem pressure regulator. As a consequence, the problems associated with a small orifice and purge problems are overcome or reduced. Additionally, the number of fluid components exposed to high pressure is reduced and yet the volume of the supply cylinder can still be monitored.

A primary advantage that may not be readily apparent from this arrangement is the ability to remotely monitor the supply pressure, and thus the supply volume. Since the pressure regulator B is disposed immediately downstream of the shutoff valve, the fluid line leading to the gage can be substantially extended without any adverse impact on the ability to monitor the supply cylinder. For example, the supply cylinder with the shutoff valve and pressure regulator attached thereto can be placed in a reinforced area with only a low pressure fluid line exiting the area. At an area downstream, and physically remote from the reinforced area, the gage C can be installed to monitor the supply pressure. This arrangement finds particular application when handling toxic and/or pyrophoric gases where it is desirable to position a system operator at as remote a location as possible from the supply cylinder.

The invention has been described with reference to the preferred embodiments and methods. Obviously modifications and alterations will occur to others upon a reading and understanding of the specification. It is intended to include all such modifications and alterations in so far as they come within the scope of the appended claims or the equivalents thereof.

What is claimed is:

1. A method of monitoring supply pressure comprising the steps of:
   providing a supply of pressurized fluid;
   regulating the pressurized fluid through a first pressure regulator to a decreased pressure level;
   measuring the fluid pressure on the outlet side of the pressure regulator;
   calibrating the regulator prior to the measuring step to determine the relationship between the fluid pressure downstream of the regulator relative to the supply pressure; and
   determining the fluid pressure on the upstream side of the pressure regulator on the basis of the measured fluid pressure on the downstream side of the pressure regulator.

2. The method as defined in claim 1 further comprising determining the fluid volume of the fluid supply on the upstream side of the pressure regulator on the basis of the measured fluid pressure on the downstream side of the pressure regulator.

3. The method as defined in claim 2 wherein the fluid pressure measuring step includes the steps of providing a pressure gage having a first set of indicia thereon and displaying volume of the fluid supply through use of the first set of indicia.

4. The method as defined in claim 3 comprising the further steps of providing a second set of indicia on the pressure gage and displaying fluid pressure on the outlet side of the pressure regulator through use of the second set of indicia.

5. The method as defined in claim 1 comprising the further steps of providing a data processing means, inputting data from said measuring step, and displaying the supply fluid pressure.

6. The method as defined in claim 1 comprising the further step of regulating the fluid pressure through a second pressure regulator after the fluid pressure measuring step.

7. The method as described in claim 6 comprising wherein the fluid measuring step includes providing a pressure gage having a first set of indicia for displaying fluid pressure on the outlet side of the first pressure regulator and a second set of indicia for displaying volume of the fluid supply.

* * * * *